H. S. GRACE.
RESILIENT VEHICLE WHEEL.
APPLICATION FILED FEB. 5, 1913.
1,072,605.
Patented Sept. 9, 1913.
2 SHEETS—SHEET 1.
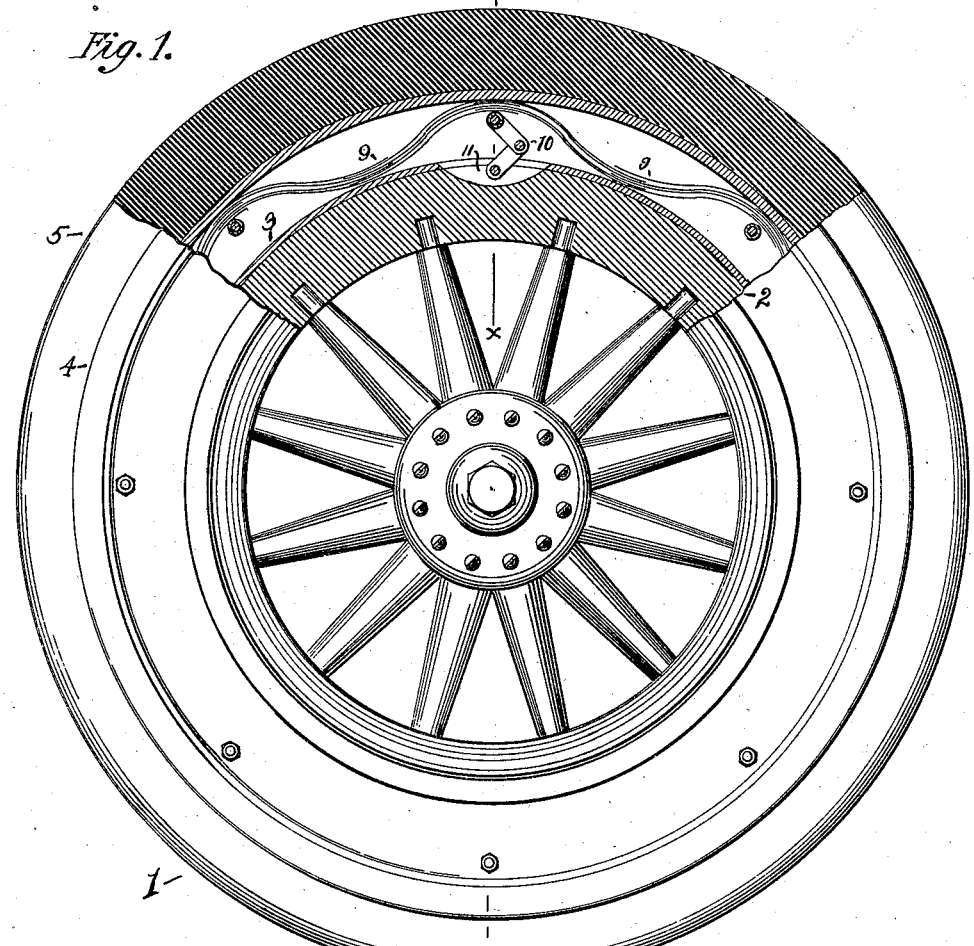
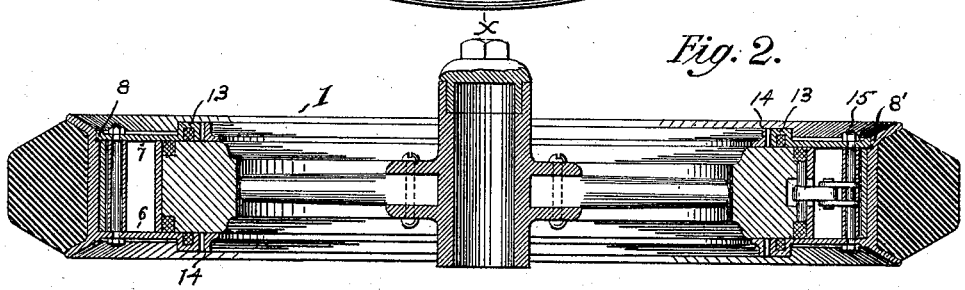
WITNESSES
INVENTOR
Henry S. Grace
BY
ATTORNEY

H. S. GRACE.
RESILIENT VEHICLE WHEEL.
APPLICATION FILED FEB. 5, 1913.

1,072,605.

Patented Sept. 9, 1913.

2 SHEETS—SHEET 2.

WITNESSES
E. S. Lemme
R. C. Young

INVENTOR
Henry S. Grace
BY
M. R. Seely
ATTORNEY

UNITED STATES PATENT OFFICE.

HENRY S. GRACE, OF SAN FRANCISCO, CALIFORNIA.

RESILIENT VEHICLE-WHEEL.

1,072,605. Specification of Letters Patent. Patented Sept. 9, 1913.

Application filed February 5, 1913. Serial No. 746,363.

*To all whom it may concern:*

Be it known that I, HENRY S. GRACE, a citizen of the United States, residing at the city and county of San Francisco, State of California, have invented certain new and useful Improvements in Resilient Vehicle-Wheels, of which the following is a specification.

My invention relates to resilient vehicle wheels, and its object is to provide a wheel for motor vehicles possessing the same resiliency and shock absorbing properties as the air-filled tire. The original cost, liability to puncture, limited load carrying properties, and the cost of maintenance makes the air-filled tire undesirable and under some conditions impractical. In my invention the above objectionable features are eliminated without the loss of resiliency or shock absorbing property.

The invention pertains to the kind of vehicle wheels disclosed in my pending application, resilient vehicle wheels, filed July 29th 1912, Serial No. 712,194.

My invention may be equipped and used with any desired tread, such as solid rubber, wood, fibrous composition or metal.

My invention is illustrated in the accompanying drawings, in which:—

Figure 3:
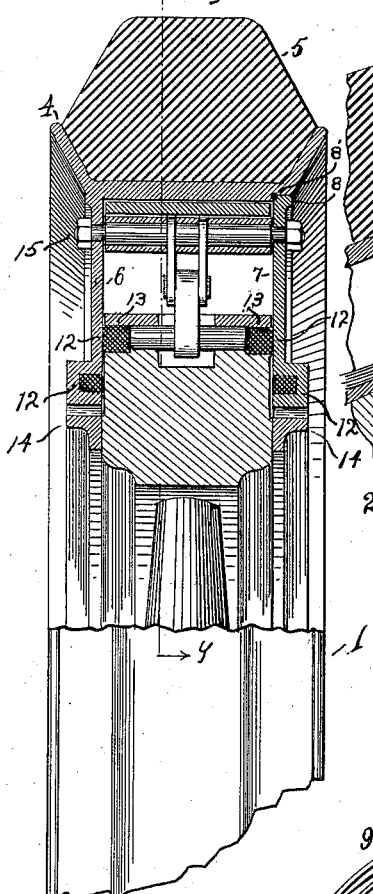
Figure 4:
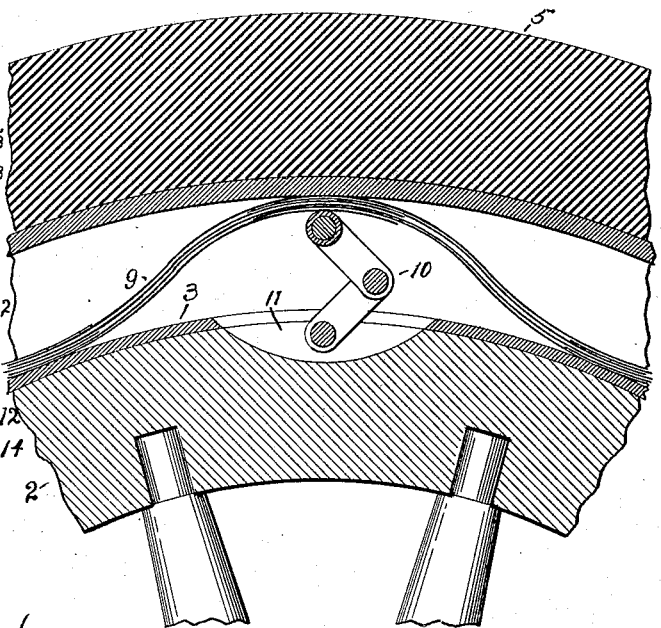
Figure 5:
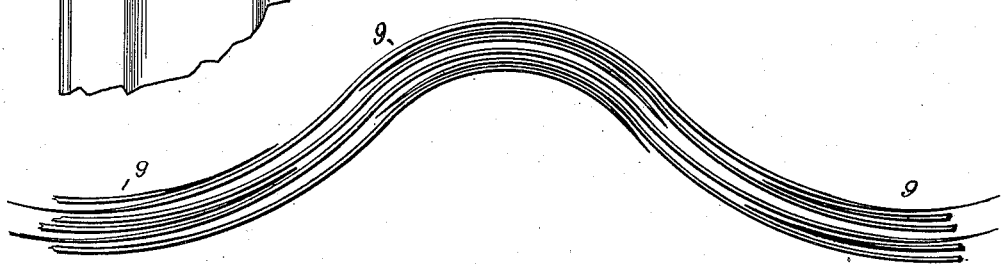

Figure 1, is a view in elevation of the wheel with a broken section showing the assembly of the overlapping springs, and the manner in which they break joints at every point of bearing. This view also shows the driving toggle, and the buffer ring and face plate in elevation. Fig. 2, is a view in cross-section taken on the line X—X, Fig. 1. Fig. 3, is an enlarged cross-section of a part of the wheel taken on the line X—X, Fig. 1, showing the channel rim with solid rubber tire, the anchorage of the toggle drive, and the face plate and the dust-proof packing rings in place. This view also shows the buffer rings in cross-section and a part of the rubber tire in plan. Fig. 4, is an enlarged view in cross-section of a part of the wheel taken on the line Y—Y, Fig. 3, showing the overlapping springs in place, the toggle drive and the felly slot in which the lower member of the toggle drive is anchored. Fig. 5, is an enlarged view of a number of overlapping springs slightly separated to show their relative position and the manner in which they break joints at each point of bearing.

The numeral 1, is used to designate a vehicle wheel whose felly 2, is shod with a metallic rim 3. The channel rim 4, may be of any suitable type for mounting the tread 5. The back plate 6, is rigidly secured to the channel rim and becomes integral therewith while the face plate 7, is detachable. The outer edge of the face plate rests on a ledge 8, provided therefor on the inside of the channel rim. At the bottom of this ledge is a packing groove 8', making a dust-proof and water-tight joint. The channel rims, back, and face plate form a box in which the felly 2, is slidably mounted. The space between the inside of the channel rim 4, and the shoe of the felly 3, forms the chamber in which the overlapping springs 9, 9, are assembled as well as the toggle driving device 10. The clearance slot 11, is provided to allow greater play for the device as well as to form a convenient anchorage for the same. At or near the lower edge of the back and face plates, on the inside of each, are the packing grooves 12, 12. These grooves are duplicated in the felly 2, at its outer edge; the metallic rim 3, forming one side of the slot. In the grooves referred to are placed the packing rings 13, 13. This packing is preferably of felt and serves to keep out dust and water, and to retain the lubricant for the springs. 14, 14, are the buffer rings rigidly secured to the felly 2. The spacing studs 15, 15, are placed in any desired number and serve to secure the face plate as well as to form an anchorage for the upper member of the driving toggle 10.

The operation of my invention is as follows:—The overlapping springs are assembled in the chamber, formed by the difference between the internal diameter of the channel rim and the peripheral diameter of the felly, in such a manner as to overlap and break joints at every point of load contact. This manner of assembling forms a multiple leaf spring of even thickness around the entire wheel, acting as a unit. In the arches of the spring the toggle driving device is placed giving perfect freedom to the action of the spring but rigidly resisting the torque of power applied to the wheel for driving. The chamber is then filled with a suitable lubricant and the face plate secured in place. The wheel is now ready for service, free from the annoying and expensive faults of the ordinary pneumatic tire. The shape of the overlapping springs, and the manner in which they are mounted, distributes the load carried by the wheel through the entire length of the spring. This gives the maximum of efficiency in both resistance and resiliency. Should the springs break under load, the wheel settles down in the channel until the side plates ride on the buffer rings. This enables the truck to deliver its load safely before the necessary repairs are made.

I do not wish to be understood as confining myself to the precise construction shown herein, but wish to avail myself of any modification that may properly fall within the scope of my invention.

Having thus described my invention, what I claim as new and desire to secure by Letters Patent, is:—

In a resilient wheel, the combination of an inner felly formed with pockets at intervals throughout its circumference, an outer channel rim spaced therefrom and concentric therewith, side plates forming a chamber, a multiple of overlapping springs interlaced, said springs forming an even means of resilient resistance between the channel rim and the felly, flexible connections securing the channel rim to said felly, assembled within the arches of said springs and comprising inner and outer transverse rods, two levers pivotally carried on the respective rods and having a toggle joint connection with each other, said outer rods having their ends permanently secured in said side plates, said inner rods being secured within side pockets, and a circumferential band secured to the outer periphery of the felly provided with slots registering with said pockets, substantially as described.

In testimony whereof, I affix my signature in presence of two witnesses.

HENRY S. GRACE.

Witnesses:
HORTENSE GARDNER,
ROBERT C. YOUNG.

---

Copies of this patent may be obtained for five cents each, by addressing the "Commissioner of Patents, Washington, D. C."